United States Patent [19]
Carroll, Jr. et al.

[11] 3,854,145
[45] Dec. 10, 1974

[54] STRIP-CHART RECORDING APPARATUS
[75] Inventors: A. Lindsay Carroll, Jr., Cohasset; Melvin J. White, Jr., Sharon, both of Mass.
[73] Assignee: The Foxboro Company, Foxboro, Mass.
[22] Filed: Nov. 28, 1973
[21] Appl. No.: 419,754

[52] U.S. Cl. .............................. 346/116, 346/136
[51] Int. Cl. .......................................... G01d 15/30
[58] Field of Search ............ 346/116, 117, 136, 68

[56] References Cited
UNITED STATES PATENTS
| | | | |
|---|---|---|---|
| 1,038,297 | 9/1912 | Clawson | 346/140 X |
| 2,446,400 | 8/1948 | Woolley | 346/136 X |
| 3,080,561 | 3/1963 | Bowditch et al. | 346/116 |

Primary Examiner—Joseph W. Hartary
Attorney, Agent, or Firm—Frank J. Fleming

[57] ABSTRACT

A strip chart recording apparatus for recording the value of a condition adapted for using compactly folded strip-chart stacks with provision to suspend the section of the strip-chart on which the recording is made under sufficient tension to maintain it substantially flat.

5 Claims, 7 Drawing Figures

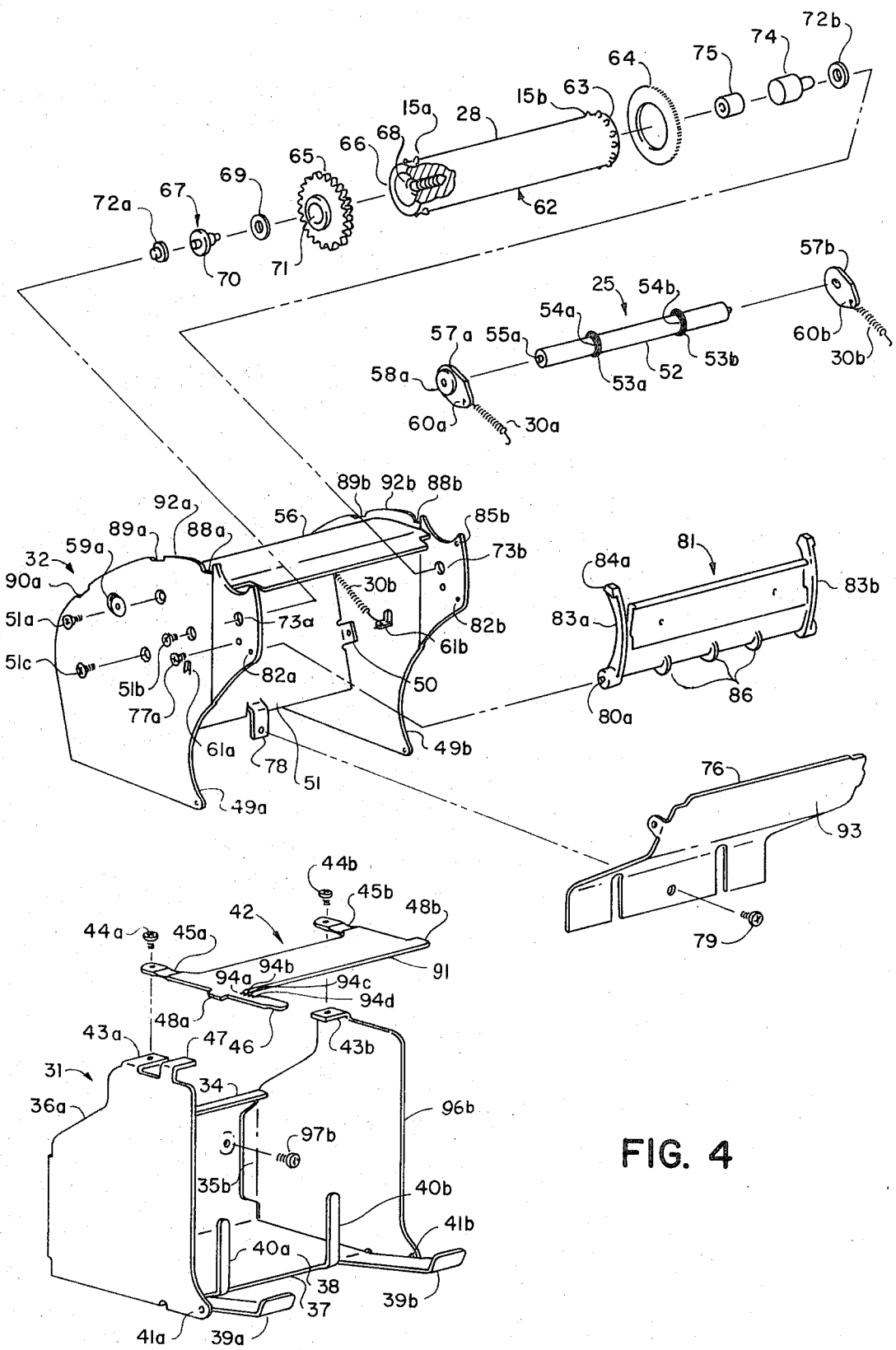

3,854,145

STRIP-CHART RECORDING APPARATUS

FIELD OF THE INVENTION

This invention relates to improvements in strip-chart recording apparatus for recording the value of a condition. This invention is more particularly related to improvements in the chart drive unit such as recorders which use compactly folded strip-chart stacks.

DESCRIPTION OF THE PRIOR ART

In the prior strip-chart recording apparatus disclosed in Bowditch et al. U.S. Pat. No. 3,080,561, the strip-charts failed to assume a sufficiently flat condition at the folds for proper recording. Bowditch et al. only partially solved the problem of recording on strip-charts having transverse perforated folds. The invention disclosed and claimed in the present application solves these problems by means not taught by Bowditch et al.

SUMMARY OF THE INVENTION

The strip-chart recording apparatus disclosed in the above cited Bowditch et al. patent has enjoyed considerable commercial success. However, several difficulties have been experienced in the operation of these apparatus. These difficulties can best be understood by pointing out that the charts used on these apparatus are made of tissue thin paper 0.002 inch or less in thickness and 4 ½ inches wide. The charts are perforated by a series of cuts across the chart with only 72 tabs 0.020 inch wide of uncut paper remaining in the width of the chart. The charts are folded accordian fashion at the line of the perforations so that the remaining tabs of uncut paper are bent substantially 180°. In the Bowditch et al. apparatus, the chart remained partially bent as it was drawn over the groove in the platen so that the folded sections present alternately a v ridge and a v valley in the chart at the point of contact with the pen. These v ridges and v valleys caused a number of operating problems.

As the pen reached the peak of a v ridge, it frequently caught in a perforation and caused the chart to tear and at times stop. As the pen climbed or decended the v ridge or v valley, the attitude of the chart with respect to the pen tip changed materially. This resulted in such problems as a skipping where no record was made or flooding so the record was too smeared to be accurately read. As a v valley passed over the groove in the platen, it might touch the bottom thereof and cause the capillary formed between the chart and bottom surface of the groove to draw the ink through the perforation and thus smear the back of the chart. In a multiple pen recording apparatus, the flooding has been known to cause the ink to be syphoned out of one pen into the other, thus making it impossible to identify a record by its color. Another problem has been that the mismatch between the attitude of chart with respect to the pen reduced the continuity of the capillary lift of the ink from the pen reservoir sufficiently so as to limit the angle at which apparatus could be mounted because of the resulting increase in the height of the pen above the ink reservoir.

Accordingly, it is an object of this invention to provide strip-chart recording apparatus that is superior to such apparatus provided heretofore. It is a further object of this invention to provide an improved recording apparatus which eliminates the foregoing disadvantages experienced in the prior commerical apparatus.

The present invention overcomes the foregoing disadvantages by locating the pen so that it records on a suspended section of the strip-chart which is under sufficient tension to draw it into a substantially flat condition. The tension is sufficient to eliminate the v ridges and v grooves without being great enough to tear the strip-chart apart at its perforations. In this manner, the strip-chart is held flat enough so that it is maintained at the proper attitude with respect to the tip of the pen for continuous legible recording. The strip-chart is drawn evenly from the compactly folded stack over a convex surface by the sprocket teeth on each end of a chart roll driven at a constant speed which engage in the equally spaced perforations located on each side of the recording section of the strip-chart. At one end of the convex surface, a tensioning device presses the chart against the surface. The chart roll is spaced a sufficient distance from the other end of the convex surface so that a section of the strip chart is suspended without support. The length of the suspended section of the strip-chart is sufficient for several pens to inscribe records thereon. Inasmuch as the recording is done on the suspended section of the strip chart, there is no underlying platen surface for the strip-chart to form a capillary that would draw the ink through the perforations to smear the back of the strip chart.

DESCRIPTION OF THE DRAWINGS

The objects and advantages of this invention will be more fully understood from the description taken in connection with the accompanying drawings, wherein:

FIG. 4 is an exploded view of the chart drive mechanism, and

DESCRIPTION OF PREFERRED EMBODIMENTS

Figure 1A:
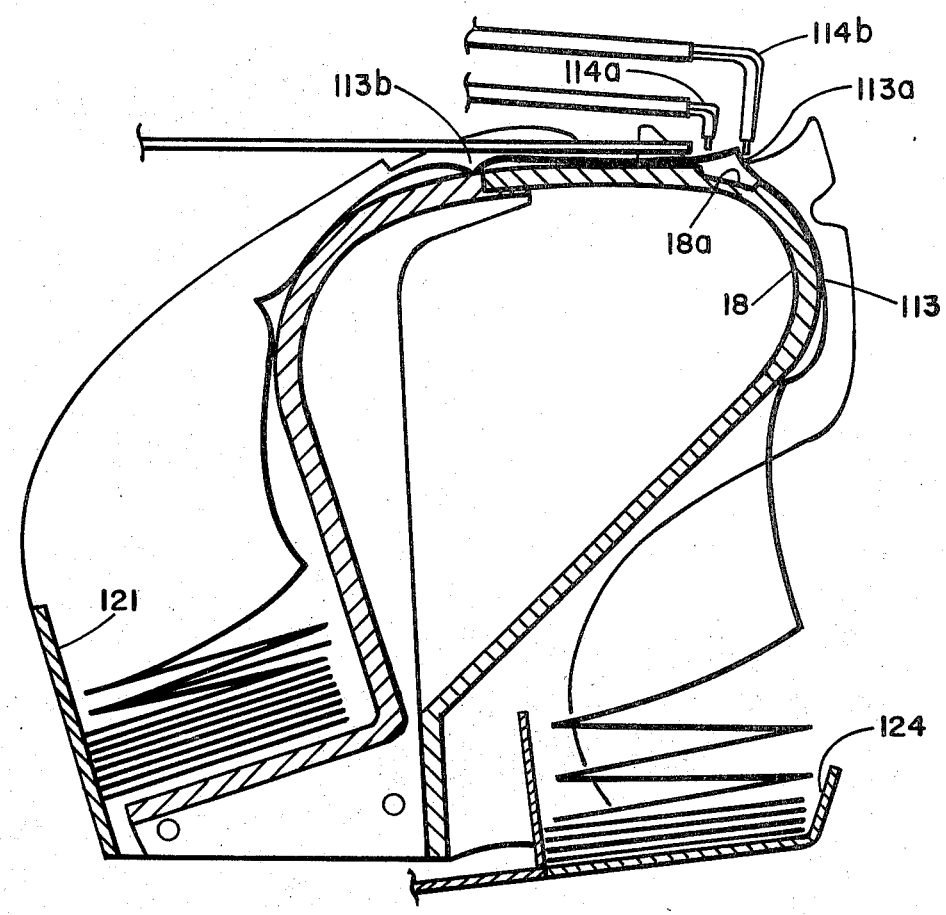
FIG. 1a is a cross-section of a prior art chart drive unit.
Figure 1B:
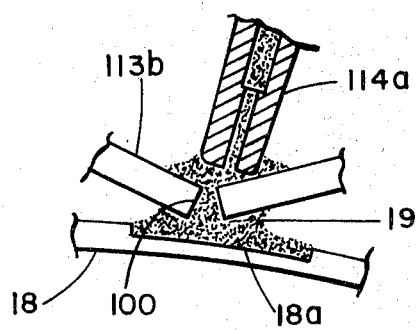
FIG. 1b is a cross-section of an enlarged view of the strip-chart of FIG. 1a showing a v-ridge over the groove in the platen.
Figure 1C:
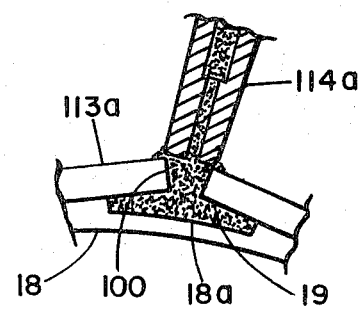
FIG. 1c is a cross-section of an enlarged view of the strip-chart of FIG. 1a showing a v-valley over the groove in the platen.

In order to appreciate the advance in the art represented by the present invention, a brief discussion of the prior apparatus is presented herein with reference to FIGS. 1a, 1b, and 1c. The strip-chart 113 is drawn (by means not shown) from the supply basket 121 over a platen 18 and deposited in receiving basket 124 with no tension applied to the strip-chart except for the weight of the chart against the surface of platen 18. A groove 18a in platen 18 is located directly beneath the point at which pens 114a and 114b inscribe data on the strip chart 113. With no tension the chart remains partially folded, resulting in presenting alternately v-ridges 113a and v-valleys 113b at the point the chart is contacted by the pens 114a and 114b and materially changing the attitude of the pen tips with respect to the surface of the chart. At each fold, the ink, generally shown at 19, enters the perforations 100. At a v-valley 113b, the chart may contact the bottom of the groove 18a to form a capillary which draws the ink through the perforation and results in a smear on the back of the chart. At a v-ridge 113a, the spacing of the chart from the bottom of the groove 18a may be sufficient to prevent smears. However, there is danger that the pen will pierce the perforation, resulting in either tearing the chart or overcoming the friction of the clutch of the drive means (not shown) and stopping the chart. Other faults resulting from the change in the attitude of the pen with respect to the chart have been discussed earlier herein and need not now be reviewed.

Figure 2:
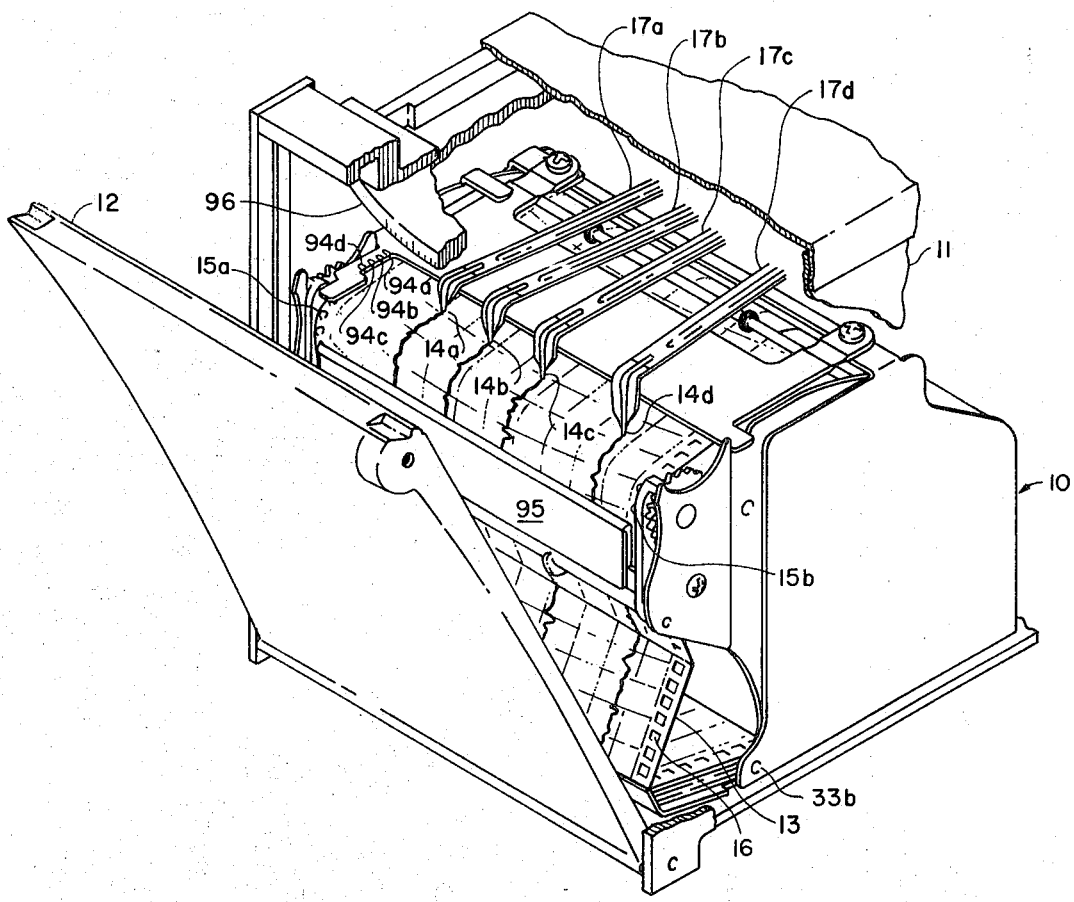
FIG. 2 is a perspective view of a strip-chart recording apparatus constructed in accordance with the present invention.

Now referring to FIG. 2, the chart drive unit 10 of the strip-chart recording apparatus is shown mounted in a cut-away section of an instrument case 11 with the door 12 partially open. The strip-chart 13 extends horizontally along the top of chart drive unit 10 and is drawn towards the front and beneath one or more recording pens 14a–14d by sprocket teeth 15a and 15b, which engage in a corresponding series of sprocket holes 16 in each side of the chart 13. The pens 14a–14d are suitably carried on the ends of pen arms 17a–17d which are pivoted at their remote ends (by the usual means not shown herein) to permit the pens to be shifted transversely across the surface of the strip chart to trace measurement data thereon.

Figure 3:
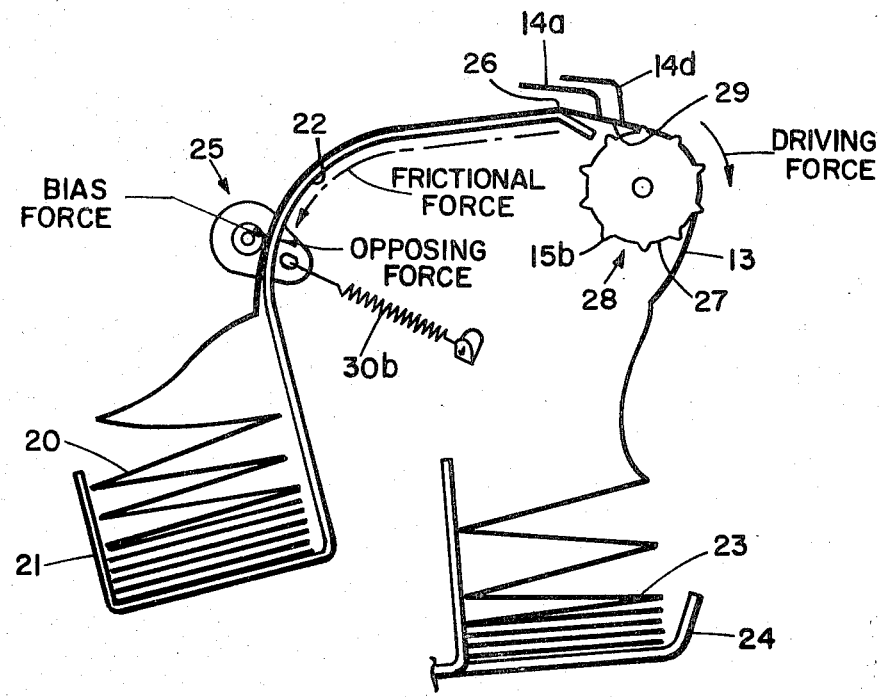
FIG. 3 is a diagram showing the principle of the invention.

In accordance with the present invention, however, the ink smears, piercing and other problems, are eliminated by the unique suspension of the chart under tension at the point at which the record is made. Referring to FIG. 3, a compactly folded stack 20 of strip-chart 13 is held loosely in supply basket 21. The chart 13 is drawn smoothly and evenly at constant speed from the basket 21 over convex surface 22 by rotation of sprocket teeth 15a and 15b which engage the series of spaced sprocket holes 16 on each edge of the chart. After leaving the sprocket teeth 15a and 15b, the chart 13 drops down and the residual memory of each fold of the chart automatically acts to refold it into its original compactly folded stack form, generally indicated at 23, as it lands in receiving basket 24. Tension is applied to chart 13 by the combination of biasing mechanism 25 and the wrap of the chart against convex surface 22. The chart 13 is suspended under tension between the end edge 26 of surface 22 and the surface 27 of chart roll 28. The recording pens 14a–14d are located over the suspended section 29 of chart 13.

In operation, the biasing mechanism 25 presses the chart firmly against the convex surface 22. Biasing pressure is applied to insure that the frictional forces resisting movement of the chart are sufficient to draw the chart substantially flat at it suspended section 29. This frictional force must be less, however, than that required to either remove the memory of the fold or tear the uncut paper remaining across the width of the chart. The frictional force may be established at a desirable value by the selection of suitable biasing springs 30a and 30b which apply the force at widely spaced points across the chart (as shown particularly in FIG. 4). By applying the force at such widely spaced points and drawing the chart by sprocket wheels 15a and 15b, engaging sprocket holes 16 located on each edge of the chart, the chart is maintained accurately in position under tension at the point of recording.

Figure 5:
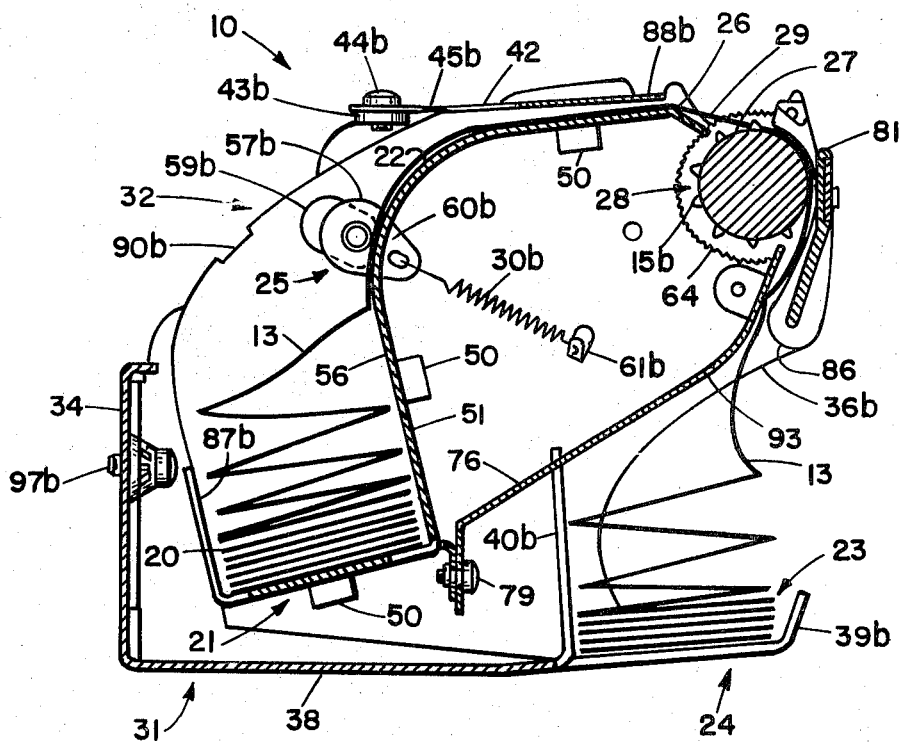
FIG. 5 is a cross-section of the chart drive mechanism with a side plate removed.

Now turning to FIGS. 4 and 5, the structure of chart drive unit 10 is more fully shown. The chart drive unit 10 consists of a frame 31 and a cradle assembly 32. The cradle assembly 32 is pivotally mounted in the frame 31 by pivots 33a (not shown) and 33b as shown in FIG. 2. The use of the pivoting feature will be explained later herein.

The frame 31 is formed from a single piece with a back wall 34 welded to tabs 35a (not shown) and 35b of side walls 36a and 36b respectively. At the front edge 37 of bottom 38 is formed a receiving basket 24 consisting of horizontal arms 39a and 39b and vertical fingers 40a and 40b. At the lower front edge of sides 36a and 36b are holes 41a and 41b respectively for receiving pivots 33a and 33b. Captive screws 97a (not shown) and 97b are located on the back wall 34 for attaching the frame 31 to a bulk-head (not shown) in the recording apparatus. A pen lifter 42 is attached to ears 43a and 43b located on sides 36a and b respectively by screws 44a and 44b. The pen lifter 42 includes flexures 45a and 45b which act as pivots for manually lifting the pen lifter as will be described more fully later herein. The upward motion of the pen lifter is limited by engaging finger 46 with stop 47 formed on the upper edge of side wall 36a. The pen lifter 42 also includes tabs 48a and 48b, the purpose of which will be explained later herein.

The cradle assembly 32 consists of the side walls 49a and 49b welded to a plurality of tabs 50 of the lateral member 51 to provide a rigid frame. A chart drive motor (not shown) is attached to side wall 49a by screws 51a, 51b, and 51c. Biasing mechanism 25 consists of a roll 52 having resilient rings 53a and 53b mounted in widely spaced grooves 54a and 54b thereon and of arbors 55a and 55b (not shown) at each end thereof. The biasing mechanism 25 is mounted in lateral contact with the back surface 56 of lateral member 51 with the arbors 55a and 55b inserted in the journal member 57a and 57b, respectively and the bosses 58a and 58b (not shown) of the journal members inserted in slots 59a and 59b located in side walls 49a and 49b respectively so that the roller 52 is movable towards and away from surface 56. Biasing springs 30a and 30b are hooked at one end to the extension 60a and 60 b of journal member 57a and 57b respectively and at the other end to ears 61a and 61b located on side walls 49a and 49b respectively.

Chart roll assembly 62 consists of a chart roll 28 at each end of which are integral therewith sprocket teeth 15a and 15b. A thumb wheel 64 is pressed onto the outer end 63 of chart roll 28 adjacent to sprocket teeth 15b. A drive gear 65 is rotatably mounted at the other end of chart roll 28 with the surface of the drive gear 65 in frictional engagement with the end 66 of the roll 28 by turning the threaded end of arbor 67 into the threaded hole 68 of roll 28 with a wave type spring washer 69 between the flange 70 of arbor 67 and the recessed surface 71 of drive gear 65. The friction between the surface of drive gear 65 and surface 66 is adjusted so that the roll 28 may be rotated manually by using thumb wheel 64 to overcome the friction without otherwise disengaging the chart drive motor. The chart roll assembly 62 is mounted on the upper front of the cradle assembly 32 by pressing bushings 72a and 72b into holes 73a and 73b in sides 49a and 49 respectively, then inserting the ends of arbor 67 in bushing 72a and arbor 74 in hole 73b with arbor 74 rotably mounted on the thumb wheel end 63 of chart roll 28. A spring 75 is inserted between chart roll 28 and arbor 74 to bias the chart roll 28 towards the side 49a to eliminate any longitudinal motion thereof and thus insure accurate registration of the chart with respect to the pens 14a–14d.

Lateral panel 76 is loosely attached to side walls 49a and 49b by screws 77a and 77b (not shown) and to ear 78 on lateral member 51 by screw 79 to enable inserting the pivots 80a and 80b (not shown) of scale holder 81 in holes 82a and 82b respectively in the front edges of side walls 49a and 49b. The screws 77a, 77b and 79 are then tightened. At the upper end of arms 83a and 83b of scale holder 81 are projecting spherical pins 84a and 84b (not shown) which, when the scale holder 81 is swung upwardly, engage detents 85a (not shown) and 85b located on the inner edge of sides 49a and 49b respectively. At the lower edge of scale holder 81 are a series of chart guide members 86.

As shown best in FIG. 5, lateral member 51 includes arms 87a (not shown) and 87b which combine with back surface 56 of the lateral member to form supply basket 21. Back surface 56 includes the convex surface 22 for supporting chart 13 to the end 26. Biasing mechanism 25 is located so that the biasing pressure against the chart 13 occurs near the start of the convex surface 22 to provide adequate wrap of the chart 13 against the convex surface 22.

Referring now to FIGS. 4 and 5, the cradle assembly 32 may be swung down about pivots 33a and 33b by lifting finger 46 of the pen lifter 42 to release tabs 48a and 48b from engagement with slots 88a and 88b located on the elevated edges 92a and 92b of the side walls 36a and 36b of the cradle assembly 32. By releasing the finger 46 to engage tabs 48a and 48b with slots 90a and 90b on the side walls 36a and 36b, the cradle assembly 32 exposes the screws 97a and 97b for attaching the chart drive unit 10 to the bulk head (not shown) in the recording apparatus. By releasing the finger 46 and swinging cradle assembly 32 fully down, the cradle assembly 32 is in a favorable position for placing the compactly folded stack 20 of strip-chart into supply basket 21 and threading the chart 13 under biasing mechanism 25 in contact with convex surface 22 and engaging the sprocket holes 16 with sprocket teeth 15a and 15b. The cradle assembly 32 is returned to its recording position swinging upward and the tabs 48a and 48b engage with slots 88a and 88b. When the tabs are engaged with slots 88a and 88b, the pens 14a–14d are accurately positioned with respect to the chart. When the pen lifter is raised to release tabs 48a and 48b from slots 88a and 88b, the upper surface of edge 91 lifts the pens 14a–14d out of contact with chart 13 and maintains them out of contact by the tabs 48a and 48b resting on the elevated edge 92a and 92b of side walls 36a and 36b.

As the chart roll 28 is rotating, the chart 13 is allowed to drop off the roll between the front surface 93 of the lateral panel 76 and chart guide members 86 on scale holder 81 and positions it so it will refold as it is received in receiving basket 24 as previously described.

Referring to FIGS. 2 and 4, notches 94a–94d on finger 46 of pen lifter 42 are provided as gauges for the longitudinal alignment of pens 14a–14d respectively over suspended section 29 of the chart 13.

As shown particularly in FIG. 2, a scale card 95 having one or more scales thereon is attached to the surface of the scale holder 81 for reading the data traced on the chart. A pen scale 96 is attached to the case 11 for reading the position of pens 14a–14d. The graduations on chart 13, the scales on scale card 95 and pen scale 96 are suitably aligned.

What is claimed is:

1. A strip-chart recording apparatus for recording the value of a condition on a strip-chart of the type having a series of equally spaced sprocket holes at each side thereof and which is supplied in a compactly folded stack comprising, in combination:
   a supply basket adapted to receive said compactly folded stack,
   a surface aligned with said supply basket to support said strip-chart as it is unfolded from said stack,
   said surface being flat in a direction transverse to the movement of said strip-chart and convex in direction of said movement,
   a chart roll having its axis of rotation aligned parallel to said flat surface and spaced a distance in the direction of said movement from the end of said surface whereby a section of said strip-chart is suspended between said end and the point of contact with said chart roll,
   said chart roll having sprocket teeth at each end thereof adapted to engage said series of equally spaced sprocket holes in said strip-chart.
   means for rotating said chart roll at a uniform speed,
   a tensioning device biased to exert a force between said strip-chart and said surface at a distance from said end whereby said force and the friction of said strip-chart in contact with said convex surface resists the pull of said sprocket teeth as said chart roll rotates, thereby providing sufficient tension to hold the suspended section of said strip-chart in its unfolded condition substantially flat,
   and pen means adapted to record on said suspended section of said strip-chart.

2. A strip-chart recording apparatus in accordance with claim 1 in which the tensioning device comprises:
   A roller in rolling contact with the opposite surface of said strip-chart from said convex surface and is spring biased towards said convex surface.

3. A strip-chart recording apparatus in accordance with claim 2 in which said roller of said tensioning device
   includes two rings in rolling contact at symmetrically spaced apart tranverse points with said strip-chart.

4. A strip-chart recording apparatus in accordance with claim 1 having a receiving basket and
   a guide means under the chart roll aligned to guide said strip-chart after it has passed over said chart roll whereby said strip-chart will reform as it enters said receiving basket into a compactly folded stack.

5. A strip-chart recording apparatus in accordance with claim 1 having a pen lifter means for manually lifting the pen means out of contact with said strip-chart,
   said pen lifter means including a knotched gauge at one side thereof aligned to provide a reference point for accurately adjusting the longitudinal recording point of said pen means along said strip-chart over said suspended section.

* * * * *